Figure 1:
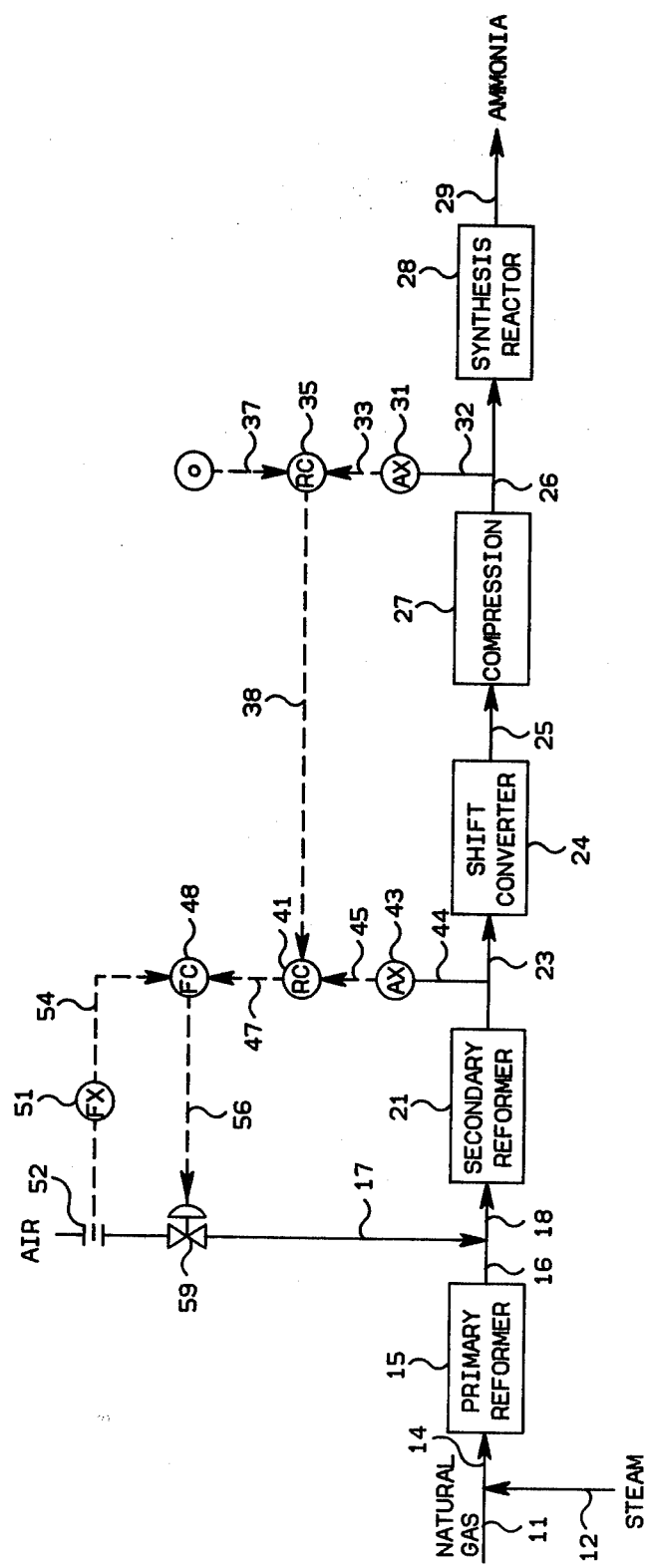

United States Patent [19]

Funk et al.

[11] Patent Number: 4,485,070

[45] Date of Patent: Nov. 27, 1984

[54] CONTROL APPARATUS FOR AN AMMONIA MANUFACTURING PROCESS

[75] Inventors: Gary L. Funk; Terry E. Bland, both of Bartlesville, Okla.

[73] Assignee: Phillips Petroleum Company, Bartlesville, Okla.

[21] Appl. No.: 476,700

[22] Filed: Mar. 18, 1983

[51] Int. Cl.³ .......................... G01N 35/00; B01J 8/04; C01C 1/04; G05D 11/00

[52] U.S. Cl. ..................................... 422/62; 364/500; 422/110; 422/111; 422/148; 423/359; 436/55

[58] Field of Search ................. 422/62, 110, 111, 148, 422/189; 423/359; 436/55; 364/500

[56] References Cited

U.S. PATENT DOCUMENTS

| 3,676,066 | 7/1972 | Pennington | 422/62 |
| 3,705,009 | 12/1972 | Dougherty | 422/148 |
| 4,069,413 | 1/1978 | Rutledge et al. | 422/108 |
| 4,088,740 | 5/1978 | Gaines | 422/148 |
| 4,094,959 | 6/1978 | Ball et al. | 423/359 |
| 4,298,588 | 11/1981 | Pinto | 423/359 |
| 4,305,918 | 12/1981 | Gaines | 422/62 |

*Primary Examiner*—Michael S. Marcus
*Attorney, Agent, or Firm*—French & Doescher

[57] ABSTRACT

In an ammonia manufacturing apparatus, control of the hydrogen to nitrogen ratio for the feed to the ammonia synthesis reactor is accomplished by controlling the hydrogen to nitrogen ratio based on the ratio of hydrogen and carbon monoxide to nitrogen in the effluent withdrawn from the secondary reformer. Also, in an ammonia manufacturing apparatus where parallel reformer trains are utilized, shifting of loading between the parallel reformer trains is accomplished using valve position control to override the control based on the ratio of hydrogen and carbon monoxide to nitrogen in the effluent withdrawn from the secondary reformer.

5 Claims, 2 Drawing Figures

CONTROL APPARATUS FOR AN AMMONIA MANUFACTURING PROCESS

This invention relates to control of an ammonia manufacturing process. In one aspect this invention relates to method and apparatus for maintaining a desired hydrogen to nitrogen ratio for the feed to the ammonia synthesis reactor. In another aspect this invention relates to method and apparatus for balancing the loads on parallel reformer trains in an ammonia manufacturing process.

In a conventional ammonia manufacturing process, a hydrocarbon-containing feed stream, such as natural gas, is converted primarily to hydrogen and carbon monoxide in first and second reformers in series. Air is added to the feed between the first and second reformers. Carbon monoxide in the effluent from the second reformer is converted to hydrogen and carbon dioxide in a shift converter. The effluent from the shift converter is purified and compressed and is then provided as the feed to the ammonia synthesis reactor.

Close control of the hydrogen to nitrogen ratio for the feed to the ammonia synthesis reactor is necessary to maximize the ammonia production from a constant quantity of feed. However, such close control is difficult to accomplish because a substantial time lag exist between the time effluent is withdrawn from the second reformer and the time such effluent is provided as feed to the synthesis reactor after processing. Thus, since the operation of the reformers basically determines the hydrogen to nitrogen ratio, substantial periods of off-specification hydrogen to nitrogen ratios may occur before a change in the reformer operating conditions can have an effect on the actual hydrogen to nitrogen ratio in the feed to synthesis reactor. It is thus an object of this invention to provide method and apparatus for maintaining a desired hydrogen to nitrogen ratio for the feed to the ammonia synthesis reactor which overcomes the problem caused by the above discussed time lag.

In some ammonia manufacturing processes, parallel reformer trains are utilized to provide the feed for the ammonia synthesis reactor. Such parallel reformer trains have a tendency to become unbalanced, i.e. one reformer train carries a higher load than the other reformer train. It is desirable to shift loading between the two reformer trains such that one reformer train does not become overloaded. However, this balancing must be accomplished while still maintaining the desired hydrogen to nitrogen ratio for the feed to the ammonia synthesis reactor. It is thus an object of this invention to provide a method and apparatus for shifting loads between parallel reformer trains while still maintaining a desired hydrogen to nitrogen ratio in the feed to the ammonia synthesis reactor.

In accordance with the present invention, control of the hydrogen to nitrogen ratio for the feed to the ammonia synthesis reactor is accomplished by controlling the hydrogen to nitrogen ratio based on the ratio of hydrogen and carbon monoxide to nitrogen in the effluent withdrawn from the second reformer. It has been found that the hydrogen and carbon monoxide to nitrogen ratio in the effluent from the second reformer provides a very good indication of what the actual hydrogen to nitrogen ratio will be in the feed to the ammonia synthesis reactor. Thus, control based on the hydrogen and carbon monoxide to nitrogen ratio in the effluent withdrawn from the second reformer can be utilized to control the actual hydrogen to nitrogen ratio in the feed to the ammonia synthesis reactor. This avoids problems caused by the delay between the time effluent is withdrawn from the second reformer and the time such effluent is provided in the ammonia synthesis reactor after processing.

Also in accordance with the present invention, method and apparatus is provided for shifting load between parallel reformer trains, in those ammonia manufacturing processes which employ parallel reformer trains, by using valve position control to control a first reformer train, when the valve position indicates that such first reformer train has reached a maximum desired loading, and using the above described control for maintaining the desired hydrogen to nitrogen ratio in the feed for the ammonia synthesis reactor to shift loading to the second reformer train. Thus, a load shifting is accomplished while still substantially maintaining a desired hydrogen to nitrogen ratio of the feed to the ammonia synthesis reactor.

Figure 2:
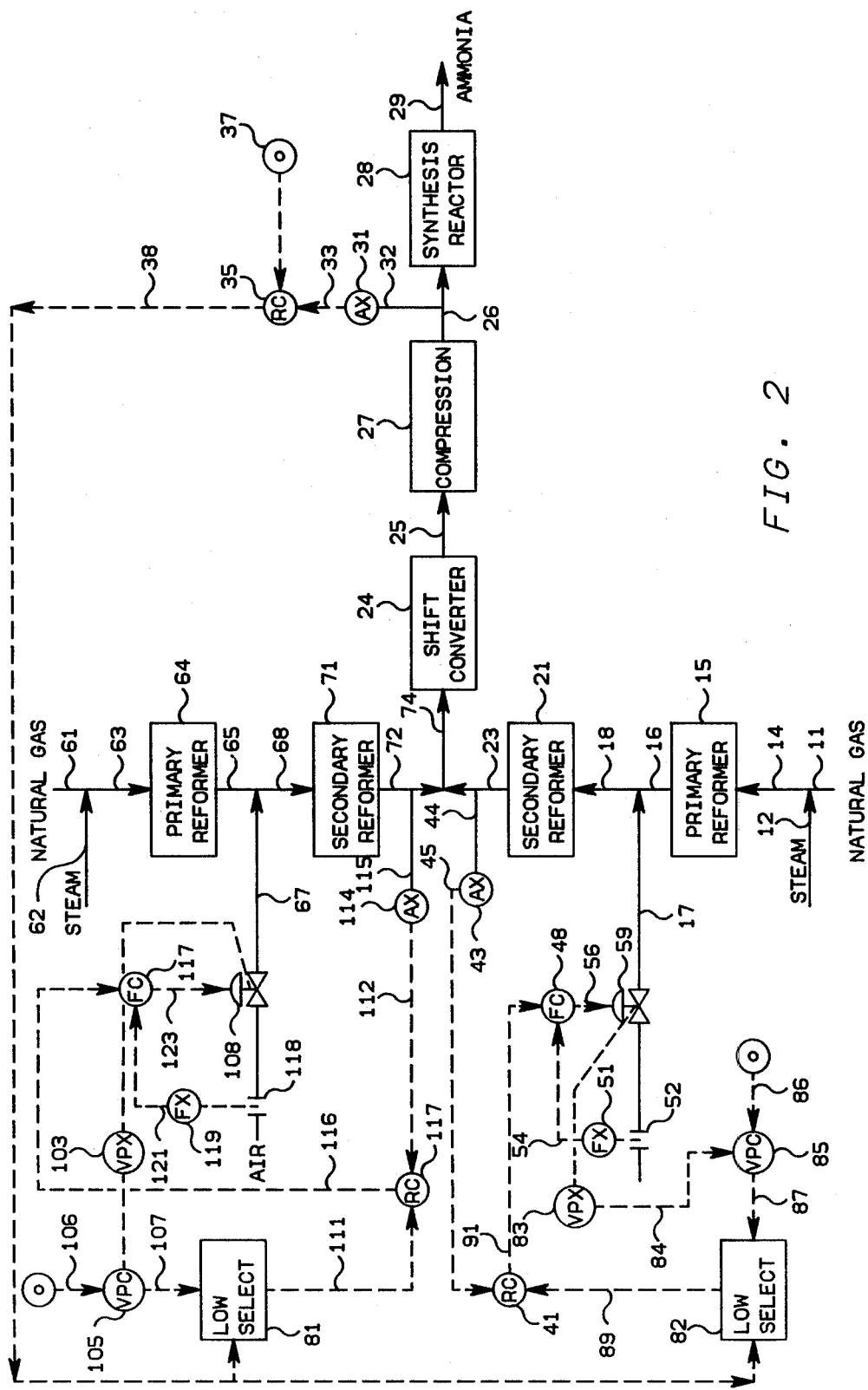

Other objects and advantages of the invention will be apparent from the foregoing brief description of the invention and the claims as well as the detailed description of the drawings which are briefly described as follows:

FIG. 1 is a diagrammatic illustration of an ammonia manufacturing process, employing a single reformer train, and the associated control system of the present invention for maintaining a desired hydrogen to nitrogen ratio for the feed to the ammmonia synthesis reactor; and FIG. 2 is a diagrammatic illustration of ammonia manufacturing process, employing parallel reformer trains, and the associated control system of the present invention for not only maintaining a desired hydrogen to nitrogen ratio for the feed to the ammonia synthesis reactor but also shifting loads between the two reformer trains.

The invention is described in terms of an ammonia synthesis process in which natural gas and steam are provided to the primary reformer and air is provided to the secondary reformer. However, the invention is applicable to ammonia manufacturing processes which employ different feeds and is also applicable to ammonia manufacturing processes which include processing steps in addition to those described hereinafter.

A specific control system configuration is set forth in FIGS. 1 and 2 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use or any other type of signal transmission, compatible with the process and equipment in use, is within the scope of the invention.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a specified controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog singal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, natural gas flowing through conduit means 11 is mixed with steam flowing through conduit means 12 and the resulting mixture is provided through conduit means 14 to the primary reformer 15. The principal reaction in the primary reformer is as follows:

$$CH_4 + H_2O \rightarrow CO + 3H_2$$

The effluent withdrawn from the primary reformer through conduit means 16 is mixed with air flowing through conduit means 17 and the resulting mixture is provided through conduit means 18 to the secondary reformer 21. The principal reaction in the secondary reformer 21 is as follows:

$$2CH_4 + 3O_2 \rightarrow 2CO + 4H_2O$$

The principal components of the effluent withdrawn from the secondary reformer will be hydrogen, carbon monoxide and nitrogen. Such effluent is provided through conduit means 23 to the shift converter 24 of the ammonia manufacturing process. The shift converter 24 is utilized to produce hydrogen by reacting carbon monoxide. The effluent from the shift converter will typically be provided to a purification section (not illustrated) which is utilized to removed undesired components such as carbon dioxide from the synthesis gas, and then through conduit means 25 to a compression section 27 which it utilized to compress the synthesis gas to the pressure required by the synthesis reactor. Thus, the effluent withdrawn from the compression section 25 will principally contain hydrogen and nitrogen and will be at high pressure. Such effluent is provided through conduit means 26 to the ammonia synthesis reactor 28.

In the ammonia synthesis reactor 28, hydrogen and nitrogen are converted to ammonia. The resulting ammonia is separated from any unconverted hydrogen and nitrogen and removed as a product through conduit means 29.

It has been found that the ratio of hydrogen and carbon monoxide to nitrogen in the effluent flowing through conduit means 23 is representative of the ratio of hydrogen to nitrogen in the synthesis gas flowing through conduit means 26. Thus, the ratio of hydrogen and carbon monoxide to nitrogen in the effluent withdrawn from the secondary reformer 21 is utilized to control the actual hydrogen to nitrogen ratio in the synthesis gas flowing through conduit means 26 as will be described more fully hereinafter. Such control overcomes the problems caused by the time delay inherent in passing the effluent from the secondary reformer 21 to the synthesis reactor 28.

The specific manner in which the control of the hydrogen to nitrogen ratio in the synthesis gas flowing through conduit means 26 is accomplished is as follows.

Analyzer transducer 31, which is typically a chromatographic analyzer such as the Model 102 Process Chromatograph System manufactured by Applied Automation Inc., is in fluid communication with conduit means 26 through conduit means 32. A sample of the synthesis gas flowing through conduit means 26 is provided to the analyzer transducer 31 through conduit means 32. In response to such sample, the analyzer transducer 31 provides an output signal 33 which is representative of the actual ratio of hydrogen to nitrogen in the synthesis gas flowing through conduit means 26. Signal 33 is provided as the process varible input to the ratio controller 35.

The ratio controller 35 is also provided with a set point signal 37 which is representative of the desired ratio of hydrogen to nitrogen in the synthesis gas. Such desired ratio if typically determined based on plant operating experience and will be a ratio which will substantially maximize the production of ammonia for a constant volume of feed.

In response to signals 33 and 37, the ratio controller 35 provides an output signal 38 which is responsive to the difference between signals 33 and 37. Signal 38 is scaled so as to be representative of the hydrogen and carbon monoxide to nitrogen ratio in the effluent flowing through conduit means 23 required to maintain the actual hydrogen to nitrogen ratio for the synthesis gas substantially equal to the desired hydrogen to nitrogen ratio represented by signal 37. Signal 38 is provided as the set point signal to the ratio controller 41.

Analyzer transducer 43, which would typically be the same type as analyzer transducer 31, is placed in fluid communication with conduit means 23 through conduit means 44. A sample of the effluent flowing through conduit means 23 is provided through conduit means 44 to the analyzer transducer 43. In response to such sample, the analyzer transducer 43 provides an output signal 45 which is representative of the actual hydrogen and carbon monoxide to nitrogen ratio in the effluent flowing through conduit means 23. Signal 45 is provided as the process variable input to the ratio controller 41.

In response to signals 38 and 45, the ratio controller 41 establishes an output signal 47 which is responsive to the difference between signals 38 and 45. Signal 47 is scaled so as to be representative of the flow rate of air through conduit means 17 required to maintain the actual hydrogen and carbon monoxide to nitrogen ratio in the effluent flowing through conduit means 23 substantially equal to the desired ratio represented by signal 38 and thus maintain the actual hydrogen to nitrogen ratio in the synthesis gas substantially equal to the desired ratio represented by signal 37. Signal 47 is provided as the set point input to the flow controller 48.

Flow transducer 51 in combination with the flow sensor 52, which is operatively located in conduit means 17, provides an output signal 54 which is representative of the actual flow rate of air through conduit means 17. Signal 54 is provided from the flow transducer 51 as the process variable input to the flow controller 48.

In response to signals 47 and 54, the flow controller 48 provides an output signal 56 which is responsive to the difference between signals 54 and 47. Signal 56 is scaled so as to be representative of the position of the control valve 59, which is operatively located in conduit means 17, required to maintain the actual flow rate of air substantially equal to the desired flow rate represented by signal 47. Signal 56 is provided from the flow controller 48 as the control signal to the control valve 59 and a control valve 59 is manipulated in response thereto.

In summary, the benefit of the ratio control of the present invention is provided by the discovery that the hydrogen and carbon monoxide to nitrogen ratio in the effluent flowing from the secondary reformer can be utilized to control the hydrogen to nitrogen ratio in the synthesis gas. Such control provides a much closer control of the hydrogen to nitrogen ratio in the synthesis gas since a change in the hydrogen and carbon monoxide to nitrogen ratio in the effluent withdrawn from the secondary reformer will cause a change in the air flow rate without having to wait for a change in the actual hydrogen to nitrogen ratio for the synthesis gas to indicate that a change in the air flow rate is needed.

Referring now to FIG. 2, an ammonia manufacturing process is illustrated which utilizes two reformer trains. Primary reformer 15 and secondary reformer 21 operate as previously described as do the shift converter 24, the compression section 27 and the ammonia synthesis reactor 28. In addition, natural gas flowing through conduit means 61 is mixed with steam flowing through conduit means 62 and the resulting mixture is provided through conduit means 63 to the primary reformer 64 which operates as previously described for the primary reformer 15. The effluent from the primary reformer 64 is withdrawn through conduit means 65 and mixed with air flowing through conduit means 67. The resulting mixture is provided through conduit means 68 to the secondary reformer 71 which operates in the same manner as previously described by the secondary reformer 21.

The effluent from the secondary reformer 71 is withdrawn through conduit means 72 and mixed with the effluent flowing through conduit means 23. The resulting mixture is provided through conduit means 74 to the shift converter 24 and is processed as has been previously described.

Signals 33 and 37 which are compared by the ratio controller 35 are the same as previously described. However, signal 38 will now not only be representative of the desired hydrogen and carbon monoxide to nitrogen ratio in the effluent stream flowing through conduit means 23 but also of the desired hydrogen and carbon monoxide to nitrogen ratio in the affluent stream flowing through conduit means 72. Signal 38 is provided from the ratio controller 35 as a first input to the low select 81 and the low select 82.

Valve position transducer 83 provides an output signal 84 which is representative of the actual position of the control valve 59. Signal 84 is provided from the valve position transducer 83 as the process variable input to the valve position controller 85.

Signal 86, which is representative of the maximum desired opening of the control valve 59, is provided as a set point to the valve position controller 85. Signal 86 will typically have a magnitude in the range of about 80% to about 90% open. Since the valve position of the control valve 59 is essentially representative of the loading on the reformer train represented by the primary reformer 15 and the secondary reformer 21, signal 86 may be considered as being representative of the maximum desired loading on the reformer train represented by the primary reformer 15 and the secondary reformer 21.

In response to signals 84 and 86, the valve position controller 85 provides an output signal 87 which is responsive to the difference between signals 84 and 86. Signal 87 is scaled so as to be representative of the hydrogen and carbon monoxide to nitrogen ratio in the effluent stream flowing into conduit means 23 required to maintain the actual position of the control valve 59 substantially equal to the maximum desired position represented by signal 86. Signal 87 is provided from the valve position controller 85 as a second input to the low select 82.

Signal 89, which is provided from the low select 82 as the set point input to the ratio controller 41, will be equal to the one of signals 38 and 87 which is representative of the lowest hydrogen and carbon monoxide to nitrogen ratio in the effluent stream flowing through conduit means 23. As will be more fully described hereinafter, signal 89 will typically be equal to signal 38. Signal 89 will only be equal to signal 87 and in those cases when a maximum loading for the reformer train represented by the primary reformer 15 and secondary reformer 21 has been reached.

Signal 45 is again representative of the actual hydrogen and carbon monoxide to nitrogen ratio in the effluent flowing through conduit means 23. In response to signals 89 and 45, the ratio controller 41 provides an output signal 91 which is responsive to the difference between signals 45 and 89. Signal 91 is scaled so as to be representative of the air flow rate required to maintain the actual hydrogen and carbon monoxide to nitrogen ratio for the effluent flowing through conduit means 23 substantially equal to the desired ratio represented by signal 89. Signal 91 is provided from the ratio controller 41 as the set point input to the flow controller 48 and is utilized as previously described to manipulate the control valve 59.

The valve position transducer 103 and the valve position controller 105 act in combination to establish signal 107 which is representative of the hydrogen and carbon monoxide to nitrogen ratio in the effluent flowing through conduit means 72 required to maintain the control valve 108 in the maximum desired open position as has been previously described with respect to the valve position transducer 83 and the valve position controller 85. Signal 111 is thus representative of the lower of signals 38 and 107 as previously described with respect to signal 89. Signal 112 is representative of the actual hydrogen and carbon monoxide to nitrogen ratio in the effluent flowing through conduit means 72 as previously described for signal 45. Signal 116 from the ratio controller 117 is utilized as previously described for signal 91 to manipulate the control valve 108.

In operation, signals 89 and 111 will typically be equal to signal 38. Thus, the flow rate of air through conduit means 17 and 67 will be manipulated so as to maintain a hydrogen and carbon monoxide to nitrogen ratio in the effluent flowing through conduit means 23 and 72 which will maintain a desired hydrogen to nitrogen ratio in the synthesis gas slowing through conduit means 26. However, if a reformer train, such as the reformer train represented by the primary reformer 15 and the secondary reformer 21 should become fully loaded, signal 89 will be equal to signal 87. In this case, control so as to maintain the desired hydrogen to nitrogen ratio in the synthesis gas will be disabled. However, if the reformer train represented by the primary reformer 64 and secondary reformer 71 is not fully loaded, the effect of the control system will be to shift the load to such reformer train when the actual hydrogen to nitrogen ratio in the synthesis gas begins to deviate from the value represented by signal 37 since only the reformer train represented by the primary reformer 64 and secondary reformer 71 can respond to such a change. Thus, the load shifting is accomplished with a minimal interruption of the maintenance of the actual hydrogen to nitrogen ratio in the synthesis gas stream.

The invention has been described in terms of a preferred embodiment as illustrated in FIGS. 1 and 2. Specific components which can be used in the practice of the invention as illustrated in FIGS. 1 and 2 such as ratio controllers 35, 41 and 117; valve position controllers 85 and 105; valve position transducers 83 and 103; flow controllers 48 and 117; flow transducers 51 and 119; and control valves 59 and 108 are each well-known commerically available control components such as are illustrated and described at length in Perry's Chemical Engineer's Handbook, 4th Edition, Chapter 22, McGraw-Hill.

Also, the low selects 81 and 82 could be implemented utilizing components such as electromechanical relays or could be implemented using a digital computer such as the Optrol 7000 manufactured by Applied Automation, Inc. It is also noted that the controller functions could also be implemented on such a digital computer if desired.

Additional equipment such as pumps, heat exchangers, additional control components, etc. which would be typically associated with an ammonia manufacturing process have not been illustrated since these additional components play no part in the description of the present invention. Also, specific details of the ammonia manufacturing process have not been illustrated because such specific details play no part in the description of the present invention.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a primary reformer;
   means for providing a hydrocarbon-containing feed stream to said primary reformer, wherein at least a portion of said hydrocarbon-containing feed stream is converted to carbon monoxide and hydrogen in said primary reformer;
   a secondary reformer;
   means for providing the effluent from said primary reformer to said secondary reformer;
   means for providing air to said secondary reformer, wherein at least some additional carbon monoxide is formed in said secondary reformer;
   a shift converter;
   means for providing the effluent stream withdrawn from said secondary reformer to said shift converter, wherein a substantial portion of the carbon monoxide contained in the effluent stream withdrawn from said secondary reformer is converted to hydrogen in said shift converter;
   compression means;
   means for passing the effluent from said shift converter through said compression means to form a synthesis gas;
   an ammonia synthesis reactor;
   means for providing said synthesis gas to said ammonia synthesis reactor, wherein hydrogen and nitrogen contained in said synthesis gas are converted to ammonia in said ammonia synthesis reactor;
   means for establishing a first signal representative of the actual hydrogen to nitrogen ratio in said synthesis gas;
   means for establishing a second signal representative of the desired hydrogen to nitrogen ratio in said synthesis gas;

means for comparing said first signal and said second signal and for establishing a third signal which is responsive to the difference between said first signal and said second signal, wherein means are provided so that said third signal is scaled so as to be representative of the ratio of hydrogen and carbon monoxide to nitrogen in the effluent stream withdrawn from said secondary reformer required to maintain the actual hydrogen to nitrogen ratio in said synthesis gas substantially equal to the desired ratio represented by said second signal;

means for establishing a fourth signal representative of the actual hydrogen and carbon monoxide to nitrogen ratio in the effluent stream withdrawn from said secondary reformer;

means for comparing said scaled third signal and said fourth signal and for establishing a fifth signal which is responsive to the difference between said scaled third signal and said fourth signal; and means for manipulating the flow of air to said secondary reformer in response to said fifth signal to thereby maintain the actual hydrogen to nitrogen ratio in said synthesis gas substantially equal to the desired ratio represented by said second signal.

2. Apparatus in accordance in claim 1 wherein means are provided so that said fifth signal is scaled so as to be representative of the flow rate of air to said secondary reformer required to maintain the actual hydrogen and carbon monoxide to nitrogen ratio in the effluent withdrawn from said secondary reformer substantially equal to the desired ratio represented by said scaled third signal and wherein said means for manipulating the flow rate of air to said secondary reformer in response to said scaled fifth signal comprises:

a control valve operatively located so as to control the flow of air to said secondary reformer;

means for establishing a sixth signal representive of the actual flow rate of air to said secondary reformer;

means for comparing said scaled fifth signal and said sixth signal and for establishing a seventh signal which is responsive to the difference between said scaled fifth signal and said sixth signal, wherein means are provided so that said seventh signal is scaled so as to be representative of the position of said control valve required to maintain the actual flow rate of air to said secondary reformer substantially equal to the desired flow rate represented by said scaled fifth signal; and means for manipulating said control valve in response to said scaled seventh signal.

3. Apparatus comprising:

a first primary reformer;

means for providing a first hydrocarbon-containing feed stream to said first primary reformer, wherein at least a portion of said first hydrocarbon-containing feed stream is converted to carbon monoxide and hydrogen in said first primary reformer;

a first secondary reformer;

means for providing the effluent stream from said first primary reformer as a feed to said first secondary reformer;

means for providing a first stream of air to said first secondary reformer, wherein additional carbon monoxide is produced in said first secondary reformer;

a second primary reformer;

means for providing a second hydrocarbon-containing feed stream to said second primary reformer, wherein at least a portion of said second hydrocarbon-containing feed stream is converted to carbon monoxide and hydrogen in said second primary reformer;

a second secondary reformer;

means for providing the effluent stream from said second primary reformer as a feed to said second secondary reformer;

means for providing a second stream of air to said secondary reformer, wherein additional carbon monoxide is produced in said second secondary reformer;

a shift converter;

means for combining the effluent withdrawn from said first secondary reformer with the effluent withdrawn from said second secondary reformer and for providing the thus combined effluent stream as the feed stream to said shift converter, wherein a substantial portion of the carbon monoxide contained in said combined effluent stream is converted to hydrogen in said shift converter;

a compression system;

means for passing the effluent from said shift converter through said compression system to form a synthesis gas stream;

an ammonia synthesis reactor;

means for providing said synthesis gas stream as a feed to said ammonia synthesis reactor, wherein a substantial portion of the hydrogen and nitrogen contained in said synthesis gas stream is converted to ammonia in said ammonia synthesis reactor;

means for establishing a first signal representative of the actual hydrogen to nitrogen ratio in said synthesis gas stream;

means for establishing a second signal representative of the desired hydrogen to nitrogen ratio in said synthesis gas stream;

means for comparing said first signal and said second signal and for establishing a third signal which is responsive to the difference between said first signal and said second signal, wherein means are provided so that said third signal is scaled so as to be representative of the hydrogen and carbon monoxide to nitrogen ratio in the effluent stream withdrawn from said first secondary reformer and the effluent stream withdrawn from said second secondary reformer required to maintain the actual hydrogen to nitrogen ratio in said synthesis gas stream substantially equal to the desired ratio represented by said second signal;

a first control valve operatively located so as to control the flow of said first stream of air;

means for establishing a fourth signal representative of the actual position of said first control valve;

means for establishing a fifth signal representative of the maximum desired open position of said first control valve;

means for comparing said fourth signal and said fifth signal and for establishing a sixth signal which is responsive to the difference between said fourth signal and said fifth signal, wherein means are provided so that said sixth signal is scaled so as to be representative of the hydrogen and carbon monoxide to nitrogen ratio in the effluent stream withdrawn from said first secondary reformer required to maintain the actual position of said first control valve substantially equal to the position represented by said fifth signal;

a first low select means;

means for providing said scaled third signal and said scaled sixth signal to said first low select means, wherein said first low select means establishes a seventh signal which is equal to the one of said scaled third and scaled sixth signals which is representative of the lowest hydrogen and carbon monoxide to nitrogen ratio;

means for establishing an eighth representative of the actual hydrogen and carbon monoxide to nitrogen ratio in the effluent stream withdrawn from said first secondary reformer;

means for comparing said seventh signal and said eighth signal and for establishing a ninth signal which is responsive to the difference between said eventh signal and said eighth signal;

means for manipulating said first control valve in response to said ninth signal to thereby maintain the actual hydrogen and carbon monoxide to nitrogen ratio in the effluent stream withdrawn from said first secndary reformer substantially equal to the desired ratio represented by said seventh signal;

a second control valve operatively located so as to control the flow of said second stream of air;

means for establishing a tenth signal representative of the actual position of said second control valve;

means for establishing an eleventh signal representative of the maximum desired open position of said second control valve;

means for comparing said tenth signal and said eleventh signal and for establishing a twelfth signal which is responsive to the difference between said tenth signal and said eleventh signal, wherein means are provided so that said twelfth signal is scaled so as to be representative of the hydrogen and carbon monoxide to nitrogen ratio in the effluent stream withdrawn from said second secondary reformer required to maintain the actual position of said second control valve substantially equal to the position represented by said the eleventh signal;

a second low select means;

means for providing said scaled third signal and said scaled twelfth signal to said second low select means, wherein said second low select means establishes a thirteenth signal which is equal to the one of said scaled third and scaled twelfth signals which is representative of the lowest hydrogen and carbon monoxide to nitrogen ratio;

means for establishing a fourteenth signal representative of the actual hydrogen and carbon monoxide to nitrogen ratio in the effluent stream withdrawn from said second secondary reformer;

means for comparing said thirteenth signal and said fourteenth signal and for establishing a fifteenth signal which is responsive to the difference between said thirteenth signal and said fourteenth signal;

means for manipulating said second control valve in response to said fifteenth signal to thereby maintain the actual hydrogen and carbon monoxide to nitrogen ratio in the effluent stream withdrawn from said second secondary reformer substantially equal to the desired ratio represented by said thirteenth signal.

4. Apparatus in accordance with claim 3 wherein means are provided so that said ninth signal is scaled so as to be representative of the flow rate of said first stream of air required to maintain the actual hydrogen and carbon monoxide to nitrogen ratio in the effluent stream withdrawn from said first secondary reformer substantially equal to the desired ratio represented by said seventh signal and wherein said means for manipulating said first control valve in response to said scaled ninth signal comprises:

means for establishing a sixteenth signal representative of the actual flow rate of said first stream of air;

means for comparing said scaled ninth signal and said sixteenth signal and for establishing a seventeenth signal which is responsive to the difference between said scaled ninth signal and said sixteenth signal, wherein means are provided so that said seventeenth signal is scaled so as to be representative of the position of said first control valve required to maintain the actual flow rate of said first stream of air substantially equal to the desired flow rate represented by said scaled ninth signal; and means for manipulating said first control valve in response to said scaled seventeenth signal.

5. Apparatus in accordance with claim 4 wherein means are provided so that said fifteenth signal is scaled so as to be representative of the flow rate of said second stream of air required to maintain the actual hydrogen and carbon monoxide to nitrogen ratio in the effluent stream withdrawn from said second secondary reformer substantially equal to the desired ratio represented by said thirteenth signal and wherein said means for manipulating said second control valve in response to said scaled fifteenth signal comprises:

means for establishing an eighteenth signal representative of the actual flow rate of said first stream of air;

means for comparing said scaled fifteenth signal and said eighteenth signal and for establishing a nineteenth signal which is responsive to the difference between said scaled fifteenth signal and said eighteenth signal, wherein means are provided so that said nineteenth signal is scaled so as to be representative of the position of said second control valve required to maintain the actual flow rate of said second stream of air substantially equal to the desired flow rate represented by said scaled fifteenth signal; and means for manipulating said second control valve in response to said scaled nineteenth signal.

* * * * *